US010864502B2

(12) United States Patent
Sung et al.

(10) Patent No.: US 10,864,502 B2
(45) Date of Patent: *Dec. 15, 2020

(54) MANGANESE-CONTAINING DIESEL OXIDATION CATALYST

(71) Applicant: BASF Corporation, Florham Park, NJ (US)

(72) Inventors: Shiang Sung, New York, NY (US); Stanley A. Roth, Yardley, PA (US); Karifala Dumbuya, Lower Saxon (DE); Susanne Stiebels, Adenbüttel (DE); Claudia Zabel, Hannover (DE); Olga Gerlach, Ludwigshafen (DE); Andreas Sundermann, Bensheim (DE)

(73) Assignee: BASF Corporation, Florham Park, NJ (US)

( * ) Notice: Subject to any disclaimer, the term of this patent is extended or adjusted under 35 U.S.C. 154(b) by 256 days.

This patent is subject to a terminal disclaimer.

(21) Appl. No.: 14/107,781

(22) Filed: Dec. 16, 2013

(65) Prior Publication Data

US 2015/0165423 A1   Jun. 18, 2015

(51) Int. Cl.
   *B01D 53/94*   (2006.01)
   *B01J 29/076*   (2006.01)
   (Continued)

(52) U.S. Cl.
   CPC .......... *B01J 29/076* (2013.01); *B01D 53/944* (2013.01); *B01D 53/945* (2013.01);
   (Continued)

(58) Field of Classification Search
   CPC .... B01D 2255/1021; B01D 2255/1023; B01D 2255/2073; B01D 2255/20738;
   (Continued)

(56) References Cited

U.S. PATENT DOCUMENTS 4,335,023 A   6/1982 Dettling et al.
4,727,052 A   2/1988 Wan et al.
(Continued)

FOREIGN PATENT DOCUMENTS

DE   102011010105   8/2011
EP   0732145   9/1996
(Continued)

OTHER PUBLICATIONS

IN (KR10-2001-0037201, machine translation).*
(Continued)

*Primary Examiner* — Smita S Patel
(74) *Attorney, Agent, or Firm* — Finnegan, Henderson, Farabow, Garrett & Dunner LLP

(57) ABSTRACT

An oxidation catalyst composite, methods, and systems for the treatment of exhaust gas emissions from a diesel engine are described. More particularly, an oxidation catalyst composite including a first washcoat comprising a zeolite, Pt, and first refractory metal oxide support containing manganese, a second washcoat comprising a second refractory metal oxide support, a Pt component and a Pd component, and a third washcoat comprising palladium and a rare earth oxide component is described.

31 Claims, 5 Drawing Sheets

(51) Int. Cl.
*B01J 37/02* (2006.01)
*B01J 35/00* (2006.01)
B01J 23/63 (2006.01)
B01J 23/40 (2006.01)
B01J 23/656 (2006.01)

(52) U.S. Cl.
CPC ....... *B01J 35/0006* (2013.01); *B01J 37/0244* (2013.01); *B01J 37/0246* (2013.01); B01D 53/9418 (2013.01); B01D 53/9477 (2013.01); B01D 2255/1021 (2013.01); B01D 2255/1023 (2013.01); B01D 2255/2061 (2013.01); B01D 2255/2063 (2013.01); B01D 2255/2065 (2013.01); B01D 2255/2066 (2013.01); B01D 2255/2068 (2013.01); B01D 2255/2073 (2013.01); B01D 2255/50 (2013.01); B01D 2255/502 (2013.01); B01D 2255/504 (2013.01); B01D 2255/9025 (2013.01); B01J 23/40 (2013.01); B01J 23/63 (2013.01); B01J 23/6562 (2013.01); Y02T 10/24 (2013.01)

(58) Field of Classification Search
CPC ........... B01D 2255/20753; B01D 2255/20746; B01D 2255/50; B01D 2255/502; B01D 2255/504; B01D 2255/9022; B01D 2255/91; B01D 53/9418; B01D 53/944; B01D 53/945; B01D 53/9477; B01D 53/94; B01J 29/076; B01J 29/061; B01J 29/068; B01J 29/088; B01J 29/123; B01J 29/166; B01J 29/185; B01J 29/22; B01J 29/26; B01J 29/405; B01J 29/44; B01J 29/48; B01J 29/655; B01J 29/67; B01J 29/69; B01J 29/7057; B01J 29/7415; B01J 29/7815; B01J 29/783; B01J 2523/00; B01J 2523/25; B01J 2523/31; B01J 2523/3712; B01J 2523/72; B01J 2523/824; B01J 2523/828; B01J 2523/41; B01J 37/08; B01J 37/20; B01J 37/10; B01J 37/0244; B01J 37/0246; B01J 37/0248

See application file for complete search history.

(56) References Cited

U.S. PATENT DOCUMENTS

| | | | |
|---|---|---|---|
| 4,961,917 A | 10/1990 | Byrne | |
| 5,516,497 A | 5/1996 | Speronello et al. | |
| 6,129,898 A * | 10/2000 | Watkins | B01D 53/9422 423/213.2 |
| 7,964,167 B2 | 6/2011 | Kim et al. | |
| 8,057,767 B1 | 11/2011 | Qi et al. | |
| 8,226,915 B2 | 7/2012 | Qi et al. | |
| 8,377,400 B2 | 2/2013 | Schmieg et al. | |
| 8,404,201 B2 | 3/2013 | Qi et al. | |
| 8,409,518 B2 | 4/2013 | Kim et al. | |
| 8,449,852 B1 | 5/2013 | Sung et al. | |
| 8,568,674 B1 * | 10/2013 | Sung | B01J 37/0244 423/213.2 |
| 8,628,742 B2 | 1/2014 | Drews et al. | |
| 2008/0045405 A1 | 2/2008 | Beutel et al. | |
| 2008/0072578 A1 * | 3/2008 | Kumar | B01D 53/945 60/299 |
| 2010/0180581 A1 * | 7/2010 | Grubert | B01D 53/944 60/297 |
| 2010/0183490 A1 * | 7/2010 | Hoke | B01D 53/945 423/213.5 |
| 2011/0165046 A1 | 7/2011 | Drews et al. | |
| 2011/0258994 A1 | 10/2011 | Park et al. | |
| 2012/0036834 A1 | 2/2012 | Qi et al. | |
| 2012/0240554 A1 | 9/2012 | Qi et al. | |
| 2013/0034472 A1 | 2/2013 | Cantrell et al. | |
| 2013/0084222 A1 | 4/2013 | Grubert et al. | |
| 2013/0149220 A1 | 6/2013 | Swallow et al. | |
| 2014/0050629 A1 | 2/2014 | Masuda et al. | |
| 2014/0065042 A1 | 3/2014 | Andersen et al. | |

FOREIGN PATENT DOCUMENTS

| | | |
|---|---|---|
| EP | 1897615 | 3/2008 |
| GB | 2481057 | 12/2011 |
| JP | 05-138026 | 6/1993 |
| JP | 2002-089246 | 3/2002 |
| JP | 2003-080033 | 3/2003 |
| JP | 2006-205037 | 8/2006 |
| KR | 10-2001-0037201 A | 5/2001 |
| KR | 2008-0103623 | 11/2008 |
| RU | 2372141 C2 | 11/2009 |
| WO | WO 2008/047170 | 4/2008 |
| WO | WO 2009/014275 | 1/2009 |
| WO | WO 2012/085572 | 6/2012 |
| WO | WO 2012/147583 | 11/2012 |
| WO | WO2013/044115 | 3/2013 |
| WO | WO 2013/046150 | 4/2013 |

OTHER PUBLICATIONS

Kim, Chang Hwan et al., Strontium-Doped Perovskites Rival Platinum Catalysts for Treating NOx in Stimulated Diesel Exhaust, *Science* vol. 327 No. 5973 Mar. 2010, 1624-1627.

Muntean, George et al., Investigation of Mixed Oxide Catalysts for NO Oxidation, ACE078, *Pacific Northwest National Laboratory* May 17, 2012, 17 pages.

Svetlana, Yashnik A. et al., Dependence of Synergetic Effect of Palladium-Manganese-Hexaaluminate Combustion Catalyst on Nature of Palladium Precursor, *Top Catal.* vol. 55 2012, 818-836.

Wang, Weichao et al., Mixed-Phase Oxide Catalyst Based on Mn-Mullite (Sm, Gc)Mn2O5 for NO Oxidation in Diesel Exhaust, *Science* vol. 337 No. 6096 Aug. 2012, 832-835.

English Language Abst. of KR 10-2001-0037201 May 7, 2001.

Written Opinion of the International Searching Authority dated Apr. 21, 2015.

* cited by examiner

MANGANESE-CONTAINING DIESEL OXIDATION CATALYST

TECHNICAL FIELD

The present invention relates to oxidation catalysts that reduce CO emission with a low light-off temperature. More specifically, embodiments are directed to layered catalyst compositions comprising three components, and their use for reducing carbon monoxide and hydrocarbon emissions, for oxidizing nitrogen monoxide to nitrogen dioxide, and for enhancing downstream SCR performance in diesel engine systems.

BACKGROUND

Operation of lean burn engines, for example, diesel engines and lean burn gasoline engines, provide the user with excellent fuel economy and have low emissions of gas phase hydrocarbons and carbon monoxide due to their operation at high air/fuel ratios under fuel lean conditions. Additionally, diesel engines offer significant advantages over gasoline (spark ignition) engines in terms of their fuel economy, durability, and their ability to generate high torque at low speed.

From the standpoint of emissions, however, diesel engines present more severe problems than their spark-ignition counterparts. Because diesel engine exhaust gas is a heterogeneous mixture, emission problems relate to particulate matter (PM), nitrogen oxides ($NO_x$), unburned hydrocarbons (HC), and carbon monoxide (CO).

$NO_x$ is a term used to describe various chemical species of nitrogen oxides, including nitrogen monoxide (NO) and nitrogen dioxide ($NO_2$), among others. NO is of concern because it transforms into $NO_2$ in the upper atmosphere where it is believed to undergo a process known as photochemical smog formation, through a series of reactions in the presence of sunlight and hydrocarbons, and is a significant contributor to acid rain. Ground level $NO_2$, on the other hand, has a high potential as an oxidant and is a strong lung irritant.

Effective abatement of $NO_x$ from lean burn engines is difficult to achieve because high $NO_x$ conversion rates typically require reductant-rich conditions. Conversion of the $NO_x$ component of exhaust streams to innocuous components generally requires specialized $NO_x$ abatement strategies for operation under fuel lean conditions. One of these strategies utilizes selective catalytic reduction (SCR) of $NO_x$, which involves the reaction of $NO_x$ in the presence of a reductant (e.g. urea) over a SCR catalyst, for example vandia-titania based catalysts or zeolites promoted with a base metal such as Cu, Fe, or other base metals. A performance enhancement can be observed when there is an adequate ratio of $NO_2/NO_x$ in the feed gas to the SCR catalyst, especially in the low temperature range (i.e. <250° C.).

Oxidation catalysts comprising a precious metal such as a platinum group metal (PGM) dispersed on a refractory metal oxide support are known for use in treating the exhaust of diesel engines to convert both hydrocarbon and carbon monoxide gaseous pollutants by catalyzing the oxidation of these pollutants to carbon dioxide and water. Such catalysts have been generally contained in units called diesel oxidation catalysts (DOC), which are placed in the exhaust flow path from a diesel-powered engine to treat the exhaust before it vents to the atmosphere. Typically, the diesel oxidation catalysts are formed on ceramic or metallic carrier substrates (such as, e.g. a flow-through monolith carrier), upon which one or more catalyst coating compositions are deposited. In addition to the conversions of gaseous HC, CO, and the soluble organic fraction (SOF) of particulate matter, oxidation catalysts that contain platinum group metals (which are typically dispersed on a refractory oxide support) promote the oxidation of nitric oxide (NO) to $NO_2$.

Catalysts used to treat the exhaust of internal combustion engines are less effective during periods of relatively low temperature operation, such as the initial cold-start period of engine operation because the engine exhaust is not at a temperature sufficiently high enough for efficient catalytic conversion of noxious components in the exhaust. To this end, it is known in the art to include an adsorbent material, such as a zeolite, as part of a catalytic treatment system in order to adsorb gaseous pollutants, usually hydrocarbons, and retain them during the initial cold-start period. As the exhaust gas temperature increases, the adsorbed hydrocarbons are driven from the adsorbent and subjected to catalytic treatment at the higher temperature.

Oxidation catalysts comprising a platinum group metal (PGM) dispersed on a refractory metal oxide support are known for use in treating exhaust gas emissions from diesel engines. Platinum (Pt) remains the most effective metal for oxidizing CO and HC in a DOC, after high temperature aging under lean conditions and in the presence of fuel sulfur. One of the major advantages of using palladium (Pd) based catalysts is the lower cost of Pd compared to Pt. However, Pd based diesel oxidation catalysts typically show higher light-off temperatures for oxidation of CO and HC, especially when used to treat exhaust containing high levels of sulfur (from high sulfur containing fuels) or when used with HC storage materials. The "light-off" temperature for a specific component is the temperature at which 50% of that component reacts. Pd-containing DOCs may poison the activity of Pt to convert HCs and/or oxidize NO and may also make the catalyst more susceptible to sulfur poisoning. These characteristics have typically limited the use of Pd-rich oxidation catalysts in lean burn operations, especially for light duty diesel application where engine temperatures remain below 250° C. for most driving conditions.

U.S. patent application Ser. No. 13/624,524, published as U.S. 2013/0084222, provides a layered diesel oxidation catalyst containing ceria as a palladium support material. While the catalyst described in U.S. 2013/0084222 provides a DOC with excellent HC and CO performance, it would be desirable to provide a diesel oxidation catalyst (DOC) that provides enhanced $NO_2$ content of the exhaust gas exiting the DOC. An enhanced $NO_2$ content is desirable to improve downstream $NO_x$ removal, particularly the performance of downstream SCR catalysts. In addition, it would desirable to provide a diesel oxidation catalyst that further lowers the light-off temperature of CO.

SUMMARY

A first aspect of the invention pertains to an oxidation catalyst composite for abatement of exhaust gas emissions from a lean burn engine. In a first embodiment, an oxidation catalyst composite comprises a carrier substrate having a length, an inlet end and an outlet end, an oxidation catalyst catalytic material on the carrier, the oxidation catalyst catalytic material comprising a first washcoat including a zeolite, Pt, and a first refractory metal oxide support containing Mn; a second washcoat including a second refractory metal oxide support, a platinum (Pt) component and a palladium (Pd) component in a ratio of Pt:Pd in the range of about 10:1 to 1:10; and a third washcoat comprising palladium and a rare earth oxide component, the third washcoat being substantially free of platinum. The oxidation catalyst composite is effective to abate hydrocarbon and carbon monoxide, and to oxidize NO to $NO_2$ in the lean burn engine exhaust.

In a second embodiment, the oxidation catalyst composite of the first embodiment is modified, wherein the first washcoat further comprises a palladium component, and the Pt:Pd ratio of the first washcoat is in the range of 1:0 to 10:1.

In a third embodiment, the oxidation catalyst composite of the first and second embodiments is modified, wherein the first washcoat is substantially free of palladium.

In a fourth embodiment, the oxidation catalyst composite of the first through third embodiments is modified, wherein the palladium component is present in an amount in the range of about 0.1 $g/ft^3$ to about 10 $g/ft^3$.

In a fifth embodiment, the oxidation catalyst composite of the first through fourth embodiments is modified, wherein the Mn content of the first washcoat is in the range of 0.1% to 20% by weight.

In a sixth embodiment, the oxidation catalyst composite of the fifth embodiment is modified, wherein the Mn content is in the range of 3 to 10% by weight.

In a seventh embodiment, the oxidation catalyst composite of the fifth and sixth embodiments is modified, wherein the Mn is present in a form selected from the group consisting of a Mn-containing solid solution with the refractory metal oxide, surface dispersed Mn on the refractory metal oxide by impregnation and discrete manganese oxide particles on the refractory metal oxide particles.

In an eighth embodiment, the oxidation catalyst composite of the fifth through seventh embodiments is modified, wherein the Mn is derived from a soluble Mn species or from bulk Mn oxides.

In a ninth embodiment, the oxidation catalyst composite of the first through eighth embodiments is modified, wherein the Mn species is selected from Mn acetate, Mn nitrate, Mn sulfate, or combinations thereof.

In a tenth embodiment, the oxidation catalyst composite of the first through tenth embodiments is modifed, wherein the bulk Mn oxide is selected from MnO, $Mn_2O_3$, $MnO_2$, or combinations thereof.

In an eleventh embodiment, the oxidation catalyst of the fifth embodiment is modified, wherein the first refractory metal oxide comprises an oxide of alumina, silica, zirconia, titania, ceria, or combinations thereof.

In a twelfth embodiment, the oxidation catalyst composite of the first through eleventh embodiments is modified, wherein the first washcoat comprises a Pt component in an amount in the range of about 10 $g/ft^3$ to 100 $g/ft^3$.

In a thirteenth embodiment, the oxidation catalyst composite of the twelfth embodiment is modified, wherein the first washcoat further comprises a Pd component in an amount in the range of about 0.1 $g/ft^3$ to 10 $g/ft^3$.

In a fourteenth embodiment, the oxidation catalyst composite of the first through thirteenth embodiments is modified, wherein the first washcoat comprises a hydrothermally stable zeolite in the form of 6 to 12 member ring structures selected from ZSM-5, beta, mordenite, Y zeolite, chabazite, ferrierite, or combinations thereof.

In a fifteenth embodiment, the oxidation catalyst composite of the first through fourteenth embodiments is modified, wherein the second refractory metal oxide support comprises an oxide of alumina, silica, zirconia, titania, ceria, or combinations thereof.

In a sixteenth embodiment, the oxidation catalyst composite of the first through fifteenth embodiments is modified, wherein the second washcoat comprises a Pt component in an amount in the range of about 10 $g/ft^3$ to 100 $g/ft^3$.

In a seventeenth embodiment, the oxidation catalyst composite of the fifteenth and sixteenth embodiments is modified, wherein the second washcoat comprises a Pd component in an amount in the range of about 10 $g/ft^3$ to 100 $g/ft^3$.

In an eighteenth embodiment, the oxidation catalyst composite of the first through seventeenth embodiments is modified, wherein the first washcoat is substantially free of barium, and the second washcoat is substantially free of zeolite.

In a nineteenth embodiment, the oxidation catalyst composite of the first through eighteenth embodiments is modified, wherein the third washcoat comprises a rare earth oxide component selected from Ce, Nd, Y, Pr, Zr, La, or combinations thereof.

In a twentieth embodiment, the oxidation catalyst composite of the nineteenth embodiment is modified, wherein the rare earth oxide component comprises ceria and is present in an amount of at least 80% by weight.

In a twenty-first embodiment, the oxidation catalyst composite of the twentieth embodiment is modified, wherein ceria is present in an amount of at least 99% by weight.

In a twenty-second embodiment, the oxidation catalyst composite of the twenty-first embodiment is modified, wherein the third washcoat comprises a Pd component in an amount in the range of about 10 $g/ft^3$ to 100 $g/ft^3$, supported on the rare earth oxide component.

In a twenty-third embodiment, the oxidation catalyst composite of the sixteenth embodiment is modified, wherein the Mn is dispersed on a refractory metal oxide support selected from the group consisting of of alumina, silica, zirconia, titania, ceria, and thereof.

In a twenty-fourth embodiment, the oxidation catalyst composite of the first through twenty-third embodiments is modified, wherein the first, second and third washcoats of the catalyst can be layered or zoned on a flow-through monolith substrate in any combination.

In a twenty-fifth embodiment, the oxidation catalyst composite of the twenty-fourth embodiment is modified, wherein the third washcoat is coated on the carrier substrate, the second washcoat is coated on top of the third washcoat, and the first washcoat is coated on top of the second washcoat.

In a twenty-sixth embodiment, the oxidation catalyst composite of the twenty-fourth and twenty-fifth embodiments is modified, wherein the second washcoat is coated on the inlet end of the carrier substrate, the third washcoat is coated on the outlet end of the carrier substrate, the first washcoat in coated on top of the second washcoat and the third washcoat.

In a twenty-seventh embodiment, the oxidation catalyst composite of the first through twenty-sixth embodiments is modified, wherein the carrier substrate comprises a flow-through monolith.

A second aspect of the invention is directed to a method for treating a diesel engine exhaust gas stream. In a twenty-eighth embodiment, the method comprises contacting the exhaust gas stream with the oxidation catalyst composite of the first through twenty-seventh embodiments.

In a twenty-ninth embodiment, the method of the twenty-eighth embodiment is modified, wherein the method further comprises passing the exhaust gas stream to an SCR catalyst composition immediately downstream from the oxidation catalyst.

In a thirtieth embodiment, the method of the twenty-ninth embodiment is modified, wherein the SCR catalyst composition is disposed on a wall flow monolith.

A third aspect of the invention is directed to a system for treatment of a lean burn engine exhaust gas stream including hydrocarbons, carbon monoxide, and other exhaust components. In a thirty-first embodiment, the system comprises an exhaust conduit in fluid communication with the lean burn engine via an exhaust manifold; the oxidation catalyst composite of the first through twenty-seventh embodiments, wherein the carrier substrate is a flow through susbtrate; and a catalyzed soot filter and an SCR catalyst located downstream from the oxidation catalyst.

In a thirty-second embodiment, the system of the thirty-first embodiment is modified, wherein a SCR catalyst is coated onto the catalyzed soot filter.

In a thirty-third embodiment, the system of the thirty-first and thirty-second embodiments is modified, wherein the SCR catalyst is on a flow through substrate immediately downstream from the oxidation catalyst and the catalyzed soot filter is downstream from the SCR catalyst.

DETAILED DESCRIPTION

Figure 1:
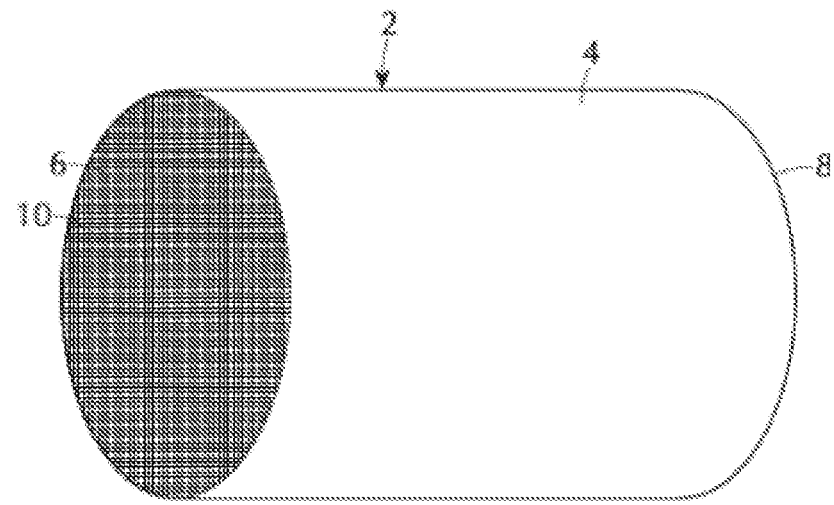
FIG. 1 is a perspective view of a honeycomb-type refractory carrier member which may comprise oxidation catalyst composites in accordance with one or more embodiments.

Before describing several exemplary embodiments of the invention, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as disclosed.

According to one or more embodiments, the excellent HC and CO performance of the catalyst are maintained, while also providing higher amounts of $NO_2$ to promote the SCR reaction on a SCR catalyst located immediately downstream from the diesel oxidation catalyst. In one or more embodiments, the oxidation catalyst generates sufficient $NO_2$ for low temperature SCR of $NO_x$ over a SCR catalyst component located immediately downstream from the oxidation catalyst. As used herein, "downstream" does not preclude there being an intervening catalyst between the oxidation catalyst and the SCR catalyst. Of course, a reductant injector will be located upstream from the SCR catalyst, and according to one or more embodiments, immediately upstream from the SCR catalyst. The reductant is typically a nitrogenous reductant such as ammonia or an ammonia precursor such as urea or a urea solution. According to one or more embodiments, other functions of the diesel oxidation catalyst are improved, such as lowering CO and HC light off.

As is known in the art, SCR of $NO_x$ in the presence of ammonia includes the following reactions:

$$4NH_3 + 4NO + O_2 \rightarrow 4N_2 + 6H_2O \text{ (standard SCR reaction)} \tag{1}$$

$$4NH_3 + 2NO + 2NO_2 \rightarrow 4N_2 + 6H_2O \text{ (fast SCR reaction)} \tag{2}$$

$$4NH_3 + 3NO_2 \rightarrow 3.5N_2 + 6H_2O \text{ (slow } NO_2\text{-SCR reaction)} \tag{3}$$

Reaction "(2)" is referred to as the fast SCR reaction. Applicants have determined that when a SCR catalyst is downstream from the diesel oxidation catalyst, for example, when a SCR catalyst is on a filter, or when the SCR catalyst is on a flow through substrate immediately downstream from the DOC, hydrocarbons tend to inhibit the fast SCR reaction. In addition, at low temperatures, for example, between 150° C. and 300° C., or between 150° C. and 250° C., conventional diesel oxidation catalysts do not provide sufficient $NO_2$ to promote SCR of $NO_x$ at temperatures below 300° C. and 250° C. The diesel oxidation catalyst according to one or more embodiments of the invention promotes SCR of $NO_x$ at low temperatures, for example below 300° C., and in some embodiments below 250° C. In one or more embodiments, the diesel oxidation catalyst traps HC, preventing the HC from inhibiting the fast SCR reaction at the SCR catalyst downstream from the diesel oxidation catalyst.

According to embodiments of the invention, it has been determined that incorporating manganese into a refractory metal oxide support provides an oxidation catalyst that that enhances the $NO_2$ content of the exhaust gas exiting the diesel oxidation catalyst (DOC), thus improving the downstream SCR reaction. Thus, in one or more embodiments, an oxidation catalyst composite comprises a carrier substrate having a length, an inlet end and an outlet end, an oxidation catalyst catalytic material on the carrier substrate, the oxidation catalyst catalytic material including a first washcoat comprising a zeolite, Pt, and a first refractory metal oxide support containing Mn, a second washcoat comprising a second refractory metal oxide support, a platinum (Pt) component and a palladium (Pd) component in a ratio of Pt:Pd in the range of about 10:1 to 1:10, and a third washcoat comprising palladium and a rare earth oxide component. In one or more embodiments, the oxidation catalyst composite is effective to abate hydrocarbon and carbon monoxide, and to oxidize NO to $NO_2$ in a lean burn engine exhaust.

With respect to the terms used in this disclosure, the following definitions are provided.

As used herein, the term "catalyst composite" refers to a catalytic article including a carrier substrate, for example a honeycomb substrate, having one or more washcoat layers containing a catalytic component, for example, a PGM component that is effective to catalyze the oxidation of CO, HC, and NO.

As used herein, the term "washcoat" has its usual meaning in the art of a thin, adherent coating of a catalytic or other material applied to a carrier substrate material, such as a honeycomb-type carrier member, which is sufficiently porous to permit the passage of the gas stream being treated. As is understood in the art, a washcoat is obtained from a dispersion of particles in slurry, which is applied to a substrate, dried and calcined to provide the porous washcoat.

As used herein, the terms "refractory metal oxide support" and "support" refer to the underlying high surface area material upon which additional chemical compounds or elements are carried. The support particles have pores larger than 20 Å and a wide pore distribution. As defined herein, such metal oxide supports exclude molecular sieves, specifically, zeolites. In particular embodiments, high surface area refractory metal oxide supports can be utilized, e.g., alumina support materials, also referred to as "gamma alumina" or "activated alumina," which typically exhibit a BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa and theta alumina phases. Refractory metal oxides other than activated alumina can be used as a support for at least some of the catalytic components in a given catalyst. For example, bulk ceria, zirconia, alpha alumina, silica, titania, and other materials are known for such use. One or more embodiments of the present invention include a refractory metal oxide support comprising an activated compound selected from the group consisting of alumina, zirconia, silica, titania, ceria, silica-alumina, zirconia-alumina, titania-alumina, lanthana-alumina, lanthana-zirconia-alumina, baria-alumina, baria-lanthana-alumina, baria-lanthana-neodymia-alumina, zirconia-silica, titania-silica, or zirconia-titania, or combinations thereof. Although many of these materials suffer from the disadvantage of having a considerably lower BET surface area than activated alumina, that disadvantage tends to be offset by a greater durability or performance enhancement of the resulting catalyst. As used herein, the term "BET surface area" has its usual meaning of referring to the Brunauer, Emmett, Teller method for determining surface area by $N_2$ adsorption. Pore diameter and pore volume can also be determined using BET-type $N_2$ adsorption or desorption experiments.

According to one or more embodiments, the first washcoat component comprises a first refractory metal oxide support comprising an oxide of alumina, silica, zirconia, titania, ceria, or combinations thereof and containing manganese (Mn) oxide. In one or more embodiments, the Mn content is in the range of 0.1% to 20% (including 0.1, 0.5, 1.0, 1.5, 2.0, 2.5, 3.0, 4.0, 5.0, 6.0, 7.0, 8.0, 9.0, 10.0, 15.0, and 20.0%) by weight, based on the weight of the refractory metal oxide support. In specific embodiments, the Mn content is in the range of 3 to 10% by weight.

Without intending to be bound by theory, it is thought that the Mn on alumina in its claimed form is neutral to sulfur poisoning. In other words, Mn will not change the sulfur resistance of the host. As used herein, the terms "sulfur aging" or "sulfur tolerance" or "sulfur resistance" refer to the capability of an oxidation catalyst to oxidize NO, CO, and HC, which is contained in the exhaust gas, also after the influence of sulfur oxides ($SO_x$). The Mn can be incorporated into the refractory metal oxide support in either bulk form or surface forms, or as discrete manganese oxide forms. In one or more embodiments, the Mn is derived from a soluble Mn species selected from Mn acetate, Mn, nitrate, Mn sulfate, or combinations thereof. In other embodiments, the Mn is derived from bulk Mn oxides selected from MnO, $Mn_2O_3$, $MnO_2$, and combinations thereof.

According to one or more embodiments, a refractory metal oxide support is impregnated with a Mn salt. As used herein, the term "impregnated" means that a Mn-containing solution is put into pores of a material such as a zeolite or a refractory metal oxide support. In detailed embodiments, impregnation of metals is achieved by incipient wetness, where a volume of diluted Mn-containing solution is approximately equal to the pore volume of the support bodies. Incipient wetness impregnation generally leads to a substantially uniform distribution of the solution of the precursor throughout the pore system of the material. Other methods of adding metals are also known in the art and can be used.

Thus, according to one or more embodiments, a refractory metal oxide support is treated with a solution of Mn dropwise, in a planetary mixer to impregnate the source with Mn. In other embodiments, a refractory metal oxide support containing Mn can be obtained from commercial sources. In specific embodiments, the first washcoat component comprises a Mn/alumina refractory metal oxide support, a zeolite, and a Pt component.

The manganese can be included with the refractory oxide support by co-precipitating manganese and the refractory oxide support precursor, and then calcining the co-precipitated material so that the refractory oxide support material and the manganese are in solid solution together. Thus, according to one or more embodiments, mixed oxides containing oxides of manganese, aluminum, cerium, silicon, zirconium and titanium can be formed.

The manganese can also be dispersed on the surface of the refractory oxide support as discrete manganese oxide particles.

In one or more embodiments, the Mn can be doped with one or more metals selected from Fe, Ni, Co, Cu, Ce, Sn, Ir, and In. It will be appreciated that in such cases when the Mn is doped with one or more metals, a mixed oxide can form.

Without intending to be bound by theory, according to one or more embodiments, it is thought that manganese interacts beneficially with platinum. In one or more embodiments, the combination of manganese and platinum, wherein the platinum is supported on a manganese-containing support, results in a synergistic effect to improve NO oxidation. It has been determined that oxidation catalysts comprising manganese without Pt have very low NO oxidation activity, in contrast to existing patent literature that implies substantial activity from Mn alone. However, in one or more embodiments, an unexpected synergy has been found whereby manganese promotes platinum, creating an oxidation catalyst composite comprising a combination of manganese and platinum that provides a more effective catalyst than a catalyst based on platinum alone.

As used herein, the term "platinum group metal" or "PGM" refers to one or more chemical elements defined in the Periodic Table of Elements, including platinum (Pt), palladium (Pd), rhodium (Rh), osmium (Os), iridium (Ir), ruthenium (Ru), and mixtures thereof. In one or more embodiments, the platinum group metal is selected from the group consisting of platinum and palladium, and mixtures thereof. In other embodiments, rhodium can be added to one or more of the washcoats.

According to one or more embodiments, the first washcoat component optionally comprises a Pd component such that there is a Pt:Pd ratio of 1:0 to 10:1. Generally, there are no specific restrictions as far as the total content of platinum of the first washcoat component. In one or more embodiments, the loading of Pt in the first washcoat component is in the range of about 10 $g/ft^3$ to 100 $g/ft^3$, and the loading of Pd in the first washcoat component is in the range of about 0.1 $g/ft^3$ to 10 $g/ft^3$. In such embodiments, Pd is added at low levels to the Pt-containing first washcoat component in an amount of not more than 10% of Pd by weight of PGM in the first washcoat component. In specific embodiments, there is less than about 10% by weight of Pd, including less than about 9%, 8%, 7%, 6%, 5%, 4%, 3%, 2%, and 1% by weight of Pd.

In other embodiments, the first washcoat component is substantially free of Pd. As used herein, the phrase "substantially free of Pd" means that there is no Pd intentionally added to the first washcoat component, rather, any loading of Pd in the first washcoat component has migrated from the other washcoat components.

It is known in the art to include an adsorbent material, which may be a zeolite, as part of a catalyst composite in order to adsorb gaseous pollutants, usually hydrocarbons, and retain them during the initial cold-start period. As the exhaust as temperature increase, the adsorbed hydrocarbons are driven from the adsorbent and subjected to catalytic treatment at the higher temperature. Thus, in one or more embodiments, the first washcoat comprises a hydrocarbon storage compound, such as a zeolite. As used herein, the term "molecular sieves", such as zeolites, refer to materials, which may in particulate form support catalytic precious group metals, the materials having a substantially uniform pore distribution, with the average pore size being no larger than 20 Å.

Typically, any structure types of zeolites/aluminosilicates can be used, such as structure types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EMT, EON, EPI, ERI, ESV, ETR, EUO, FAU, FER, FRA, GIS, GIU, GME, GON, GOO, HEU, IFR, IHW, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof.

The zeolite can be a natural or synthetic zeolite such as faujasite, chabazite, clinoptilolite, mordenite, silicalite, zeolite X, zeolite Y, ultrastable zeolite Y, ZSM-5, ZSM-12, SSZ-3, SAPO 5, offretite, or a beta zeolite. Specific examples zeolite materials have a high silica to alumina ratio. The zeolites may have a silica:alumina molar ratio of from at least 25:1, specifically at least 50:1, with useful ranges of from 25:1 to 1000:1, 50:1 to 500:1 as well as 25:1 to 300:1, from 100:1 to 250:1, or alternatively from 35:1 to 180:1 is also exemplified. Specific examples zeolites include ZSM-5, Y, and beta zeolites.

In one or more embodiments, the first washcoat comprises a hydrothermally stable zeolite in the form of 6 to 12 member ring structures selected from ZSM-5, beta zeolite, mordenite, Y zeolite, chabazite, ferrierite, or combinations thereof. In a specific embodiment, the first washcoat comprises beta zeolite. According to one or more embodiments, the first washcoat comprises a zeolite in a total amount of from 0.1 to 1 g/in$^3$, including 0.1, 0.2, 0.3, 0.4, 0.5, 0.6, 0.7, 0.8, 0.9, and 1.0 g/in$^3$. In a specific embodiment, the first washcoat comprises a zeolite in a total amount of about 0.5 g/in$^3$.

According to one or more embodiments, the second washcoat is substantially free of zeolite. As used herein, the term "substantially free of zeolite" means that there is no zeolite intentionally added to the second washcoat, and that there is less than about 5% of zeolite by weight in the second washcoat.

According to one or more embodiments, the second washcoat comprises a second refractory metal oxide support, a platinum component and a palladium component. In one or more embodiments, the second refractory metal oxide support is selected from an oxide of alumina, silica, zirconia, titania, ceria, or combinations thereof.

The ratio of platinum to palladium in the second washcoat can be varied over a wide range. Generally, there are no specific restrictions as far as the platinum to palladium weight ratio of the second washcoat is concerned provided that the platinum to palladium weight ratio of the third washcoat is lower than the platinum to palladium weight ratio of the second washcoat.

There are no specific restrictions as far as the platinum to palladium weight ratio of the second washcoat is concerned provided that the platinum to palladium weight ratio of the third washcoat is lower than the platinum to palladium weight ratio of the second washcoat. In one or more embodiments, the platinum to palladium weight ratio of the second washcoat is in the range of from about 10:1 to 1:10, including 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, and 1:10. The loading for the PGM in the second washcoat can be in the range of about 10 g/ft$^3$ to 200 g/ft$^3$.

In one or more embodiments, the platinum to palladium weight ratio of the third washcoat is in the range of from about 0:1 to 1.1:1, including 0:1, 0.1:1, 0.2:1, 0.3:1, 0.4:1, 0.5:1, 0.6:1, 0.7:1, 0.8:1, 0.9:1, 1:1, and 1.1:1. In one or more embodiments, the third washcoat is substantially free of platinum. As used herein, the phrase "substantially free of Pt" means that there is no Pt intentionally added to the third washcoat, and that there is less than about 5% of Pt by weight in the third washcoat. It is appreciated, however, by one of skill in the art that during loading some Pt present in the first and second washcoats can migrate to the third washcoat, such that a trace amount of Pt metal may be present in the third washcoat. In specific embodiments, there is less than about 5% by weight of Pt, including less than about 5%, 4%, 3%, 2%, and 1% by weight of Pt.

According to one or more embodiments, the platinum to palladium weight ratio of the third washcoat is lower than the platinum to palladium weight ratio of the second washcoat. In specific embodiments, the ratio of the platinum to palladium ratio of the third washcoat to the platinum to palladium weight ratio of the second washcoat is lower than or equal to 0.9, including ratios of 0.9, 0.8, 0.7, 0.6, 0.5, 0.4, 0.3, 0.2, and 0.1.

Generally, there are no specific restrictions as far as the palladium content of the second washcoat is concerned provided that that platinum to palladium weight ratio of the third washcoat is lower than the platinum to palladium weight ratio of the second washcoat. In one or more embodiments, the second washcoat comprise platinum and palladium in a total loading amount of from about 20 to about 200 g/ft$^3$, including 20, 30, 40, 50, 60, 70, 80, 90, 100, 110, 120, 130, 140, 150, 160, 170, 180, 190, and 200 g/ft$^3$. There are also no specific restrictions as far as the platinum content of the second washcoat is concerned. In specific embodiments, the loading of Pt in the second washcoat is in the range of about 10 g/ft$^3$ to 100 g/ft$^3$, and the loading of Pd in the second washcoat is in the range of about 10 g/ft$^3$ to 100 g/ft$^3$.

Generally, there are no specific restrictions as far as the palladium content of the third washcoat is concerned provided that the platinum to palladium weight ratio of the third washcoat is lower than the platinum to palladium weight ratio of the second washcoat. In one or more embodiments, the third washcoat comprises palladium in an amount of from 6 to 100 g/ft$^3$.

Generally, there are no specific restrictions as far as the platinum content of the third washcoat is concerned provided that the platinum to palladium weight ratio of the third washcoat is lower than the platinum to palladium weight ratio of the second washcoat. In one or more embodiments, the third washcoat is substantially free of platinum. In specific embodiments, the third washcoat comprises platinum in an amount of from 0 to 15 g/ft$^3$.

Therefore, in one or more embodiments, the oxidation catalyst composite comprises a carrier substrate having a length, an inlet end and an outlet end, an oxidation catalyst catalytic material on the carrier substrate, the oxidation catalyst catalytic material including a first washcoat comprising a zeolite, Pt, and a first refractory metal oxide support containing Mn, the first washcoat being substantially free of palladium; a second washcoat comprising a second refractory metal oxide support, a platinum (Pt) component and a palladium (Pd) component in a ratio of Pt:Pd in the range of about 10:1 to 1:10; and a third washcoat comprising palladium and a rare earth oxide component, the third washcoat being substantially free of platinum.

According to one or more embodiments, the third washcoat component comprises palladium impregnated on a support material comprising a rare earth oxide component. As used herein, the term "rare earth oxide component" refers to at least one oxide of a rare earth metal selected from Ce, Pr, Nd, Eu, Sm, Yb, and La, and mixtures thereof. In one or more embodiments, the rare earth oxide component comprises ceria.

In one or more embodiments, the third washcoat comprises palladium impregnated on a support material comprising ceria in an amount of at least 30 weight-% based on the total weight of the support material. In specific embodiments, the support material of the third washcoat comprises ceria in an amount of at least 65 weight-%, including at least 75 weight-%, at least 85 weight-%, at least 95 weight-%. In very specific embodiments, the support material of the third washcoat comprises ceria in an amount of 100 weight-% based on the total weight of the support material.

In one or more embodiments, the support material of the third washcoat compone further comprises zirconia and/or alumina. In other embodiments, the support material of the third washcoat component further comprises a modifier selected from LaO$_3$, Pr$_6$O$_{11}$, HfO$_2$, Y$_2$O$_3$, Yb$_2$O$_3$, Nd$_2$O$_3$, NdO, WO$_3$, SiO$_2$, TiO$_2$, MnO$_2$, Al$_2$O$_3$, ZrO2, and combinations thereof. In specific embodiments, the rare earth oxide component is mixed with ZrO$_2$, La$_2$O$_3$, Pr$_6$O$_{11}$, and/or HfO$_2$. For example, in one or more specific embodiments, the support material of the third washcoat comprises a ceria-zirconia material consisting of CeO$_2$: 45 wt %, ZrO$_2$: 43.5 wt %, La$_2$O$_3$: 8 wt %, Pr$_6$O$_{11}$: 2 wt %, and HfO$_2$: 1.5 wt %.

In one or more embodiments, the second washcoat is substantially free of a rare earth oxide. As used herein, the phrase "substantially free of a rare earth oxide" means that there is no rare earth oxide intentionally added to the second washcoat, and that there is less than about 5% of rare earth oxide (e.g. ceria) by weight in the second washcoat. It is appreciated, however, by one of skill in the art that during loading some rare earth oxide present in the third washcoat can migrate to the second washcoat, such that a small amount of rare earth oxide may be present in the second washcoat. In specific embodiments, there is less than about 5% by weight of rare earth oxide, including less than about 5%, 4%, 3%, 2%, and 1% by weight of rare earth oxide.

Each of the components of the oxidation catalyst composite according to the present invention is formed from a washcoat composition that contains the respective support material as described above. Other additives such as binders and stabilizers can also be included in the washcoat composition. As disclosed in U.S. Pat. No. 4,727,052, porous support materials, such as activated alumina, can be thermally stabilized to retard undesirable alumina phase transformations from gamma to alpha at elevated temperatures. Stabilizers can be selected from alkaline earth metal components selected from the group consisting of magnesium, barium, calcium and strontium. When present, stabilizer materials are added at from about 0.01 g/in$^3$ to 0.2 g/in$^3$ in the coating.

In one or more embodiments, the second washcoat can further comprise an alkaline earth metal selected from Mg, Ca, Sr, and Ba. The alkaline earth can be present in an amount of from about 20 g/ft$^3$ to about 120 g/ft$^3$ (including 20, 30, 40, 50, 60, 70, 80, 90, 100, 110 and 120 g/ft$^3$).

In one or more embodiments, the first washcoat is substantially free of an alkaline earth metal. In specific embodiments, the first washcoat is substantially free of barium. As used herein, the term "substantially free of barium" means that there is no barium intentionally added to the first washcoat, and that there is less than about 5% of barium by weight in the first washcoat. It is appreciated, however, by one of skill in the art that during loading some barium present in the second washcoat can migrate to the first washcoat, such that a trace amount of barium may be present in the first washcoat. In specific embodiments, there is less than about 5% by weight of barium, including less than about 4%, 3%, 2%, and 1% by weight of barium in the first washcoat.

According to one or more embodiments, the oxidation catalyst composite can further comprise an undercoat layer located between the carrier substrate and the third washcoat layer. In one or more embodiments, the undercoat layer comprises alumina, specifically gamma-alumina. In embodiments, where the undercoat layer is present, the undercoat layer is coated over the carrier substrate, and then the third washcoat layer can be coated over (on top) of the undercoat layer.

In one or more embodiments, the oxidation catalyst including the first, second, and third washcoats is then applied to a ceramic or metallic flow-through monolith, or a wall flow filter. As used herein, the term first, second or third "washcoat" is used to denote the location of the diesel oxidation catalyst on the carrier substrate. It will be appreciated that there is no particular order to the layering or zoning of the washcoats. In one or more embodiments, the third washcoat is coated on the carrier substrate, the second washcoat is then coated on top (or over) the third washcoat, and the first washcoat is then coated on top (or over) the second washcoat. In other embodiments, the first washcoat is coated on the carrier substrate, the second washcoat is then coated on top (or over) the first washcoat, and the third washcoat is then coated on top (or over) the second washcoat. In still further embodiments, the washcoats are coated on a carrier substrate, such that one washcoat is upstream and the other washcoat is downstream. For example, in one or more embodiments, the third washcoat is coated on the carrier, and then the second (inlet) and first (outlet) washcoats are coated over (on top) of the third washcoat. In other embodiments, the second washcoat is coated on the carrier and then the first (inlet) and third (outlet) washcoats are coated over (on top) of the second washcoat. In further embodiments, the first (inlet) and third (outlet) washcoats are coated on the carrier, and the second washcoat is then coated over (on top) of the first and third washcoats. In still further embodiments, the second (inlet) and third (outlet) washcoats are coated on the carrier, and the first washcoat is then coated over (on top) of the second and third washcoats. It will be appreciated by one skilled in the art, that any arrangement of the three washcoat layers/components, either in a layered or zone structure, is possible.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

As used herein, the term "stream" broadly refers to any combination of flowing gas that may contain solid or liquid particulate matter. The term "gaseous stream" or "exhaust gas stream" means a stream of gaseous constituents, such as the exhaust of a lean burn engine, which may contain entrained non-gaseous components such as liquid droplets, solid particulates, and the like. The exhaust gas stream of a lean burn engine typically further comprises combustion products, products of incomplete combustion, oxides of nitrogen, combustible and/or carbonaceous particulate matter (soot), and un-reacted oxygen and nitrogen.

According to one or more embodiments, the second washcoat is coated on the inlet end of the carrier substrate, and third washcoat is coated on the outlet end of the carrier substrate, and the first washcoat is coated on top (or over) the second and third washcoats. In such embodiments, it will be appreciated that platinum is concentrated into the top washcoat layer to enhance NO oxidation.

The Carrier Substrate

As used herein, the terms "carrier" and "substrate" refer to the monolithic material onto which the refractory metal oxide support is placed, typically in the form of a washcoat containing a plurality of supports having catalytic species thereon. According to one or more embodiments, the substrate may be any of those materials typically used for preparing DOC catalysts and will comprise a metal or ceramic honeycomb structure. Any suitable substrate may be employed, such as a monolithic substrate of the type having a plurality of fine, parallel gas flow passages extending therethrough from an inlet or an outlet face of the substrate, such that passages are open to fluid flow therethrough. The passages, which are essentially straight paths from their fluid inlet to their fluid outlet, are defined by walls in which the catalytic material is coated as a "washcoat" so that the gases flowing through the passages contact the catalytic material. A washcoat is formed by preparing a slurry containing a specified solids content (e.g., 30-50% by weight) of supports in a liquid medium, which is then coated onto a carrier substrate and dried to provide a washcoat layer.

The flow passages of the monolithic substrate are thin-walled channels which can be of any suitable cross-sectional shape and size such as trapezoidal, rectangular, square, sinusoidal, hexagonal, oval, circular, etc. Such structures may contain from about 60 to about 600 or more gas inlet openings (i.e., "cells") per square inch of cross section.

The ceramic substrate may be made of any suitable refractory material, e.g., cordierite, cordierite-αalumina, silicon nitride, silicon carbide, zircon mullite, spodumene, alumina-silica magnesia, zircon silicate, sillimanite, magnesium silicates, zircon, petalite, α-alumina, aluminosilicates and the like.

The substrates useful for the layered oxidation catalyst composites according to one or more embodiments may also be metallic in nature and may be composed of one or more metals or metal alloys. The metallic substrates may be employed in various shapes such as corrugated sheet or monolithic form. Suitable metallic supports include the heat resistant metals and metal alloys such as titanium and stainless steel as well as other alloys in which iron is a substantial or major component.

Preparation of Catalyst Composites

The oxidation catalyst composites according to one or more embodiments may be formed in a single layer or in multiple layers. In some circumstances, it may be suitable to prepare one slurry of catalytic material and use this slurry to form multiple layers on the substrate. The catalyst composites can be prepared by known processes, e.g. incipient wetness. A representative process is set forth below.

The catalyst composite can be prepared in layers on a monolith substrate. For a first layer of a specific washcoat, finely divided particles of a high surface area refractory metal oxide such as gamma alumina are slurried in an appropriate vehicle, e.g. water. The substrate may then be dipped one or more times in such slurry or the slurry may be coated on the substrate such that there will be deposited on the substrate the desired loading of the metal oxide. To incorporate components such as precious metals (e.g. palladium, platinum, rhodium, and/or combinations) and stabilizers and/or promoters, such components may be incorporated in the slurry prior to substrate coating as a mixture of water soluble or water-dispersible compounds or complexes. Thereafter, the coated substrate is calcined by heating, e.g., at 400-600° C. for about 10 minutes to about 4 hours. When platinum and/or palladium are desired, the platinum and palladium components are used in the form of compounds or complexes to achieve dispersion of the component on the refractory metal oxide support, e.g. activated alumina. As used herein, the term "platinum component" and "palladium component" refer to any compound, complex, or the like which, upon calcinations or use thereof, decomposes or otherwise converts to a catalytically active form, usually the metal or the metal oxide. Generally, aqueous solutions of soluble compounds or complexes of the precious metals are used. Non-limiting examples of suitable compounds include palladium nitrate, tetraammine palladium nitrate, platinum chloride, tetraammine platinum acetate, and platinum nitrate. During the calcination steps, or at least during the initial phase of use of the composite, such compounds are converted into a catalytically active form of the metal or a compound thereof.

A suitable method of preparing any layer of the layered catalyst composite is to prepare a mixture of a solution of a desired precious metal compound (e.g., a platinum compound and/or palladium compound) and at least one support, such as a finely divided, high surface area, refractory metal oxide support, e.g., gamma alumina, which is sufficiently dry to absorb substantially all of the solution to form a wet solid which is later combined with water to form a coatable slurry. In one or more embodiments, the slurry is acidic, having, for example, a pH of about 2 to less than about 7. The pH of the slurry may be lowered by the addition of an adequate amount of an inorganic acid or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like. Thereafter, if desired, water-soluble or water-dispersible compounds and/or stabilizers, e.g., barium acetate, and a promoter, e.g., lanthanum nitrate, may be added to the slurry.

In one or more embodiments, the slurry is pulverized to result in substantially all of the solids having particle sizes of less than 18 micron. The pulverization may be accomplished in a ball mill or other similar equipment, and the solids content of the slurry may be, e.g., about 20-60 wt % or 30-40 wt %.

Additional layers, i.e., a second layer may be prepared and deposited upon the first layer in the same manner as described for the deposition of the first layer upon the substrate.

Figure 2:
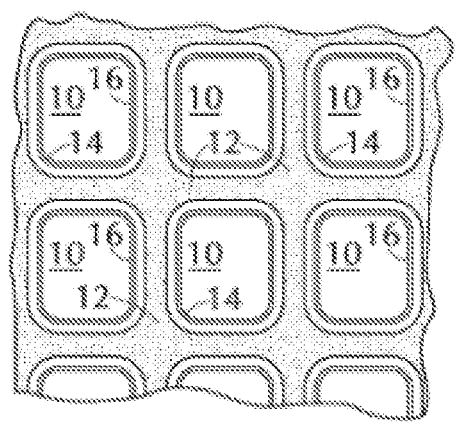
FIG. 2 is a partial cross-sectional view enlarged relative to FIG. 1, which shows an enlarged view of one of the gas flow passages shown in FIG. 1.

The catalyst composite according to one or more embodiments may be more readily appreciated by references to FIGS. 1 and 2. FIGS. 1 and 2 show a refractory substrate member 2, in accordance with one or more embodiments. Referring to FIG. 1, the refractory substrate member 2 is a cylindrical shape having a cylindrical outer surface 4, an upstream end face 6 and a downstream end face 8, which is identical to end face 6. Substrate member 2 has a plurality of fine, parallel gas flow passages 10 formed therein. As see in FIG. 2, flow passages 10 are formed by walls 12 and extend through substrate 2 from upstream end face 6 to downstream end face 8, the passages 10 being unobstructed so as to permit the flow of a fluid, e.g., a gas stream, longitudinally through substrate 2 via gas flow passages 10 thereof. As is more easily seen in FIG. 2, walls 12 are so dimensioned and configured that gas flow passages 10 have a substantially regular polygonal shape, substantially square in the illustrated embodiment, but with rounded corners in accorded with U.S. Pat. No. 4,335,023. A first washcoat 14 is adhered to or coated onto the walls 12 of the substrate member. As shown in FIG. 2, a second washcoat 16 is coated over the first washcoat 14. In one or more embodiments, a third washcoat (not shown) can be applied on top of the second washcoat 16.

As shown in FIG. 2, the substrate member 2 includes void spaces provided by the gas-flow passages 10, and the cross-sectional area of these passages 10 and the thickness of the walls 12 defining the passages will vary from one type of substrate member to another. Similarly, the weight of washcoat applied to such substrates will vary from case to case. Consequently, in describing the quantity of washcoat or catalytic metal component or other component of the composition, it is convenient to use units of weight of component per unit volume of catalyst substrate. Therefore, the units grams per cubic inch ("g/in$^3$") and grams per cubic foot ("g/ft$^3$") are used herein to mean the weight of a component per volume of substrate member, including the volume of void spaces of the substrate member.

In another embodiment, the washcoat layers may be coated such that the washcoats form a single layer coated over the substrate. In some circumstances, the washcoat layers may be zone coated such that the second washcoat is on the upstream (inlet) end, and the third washcoat is on the downstream (outlet) end of the substrate, and then the first washcoat can be coated over the top of the second and third washcoats.

Figure 3:
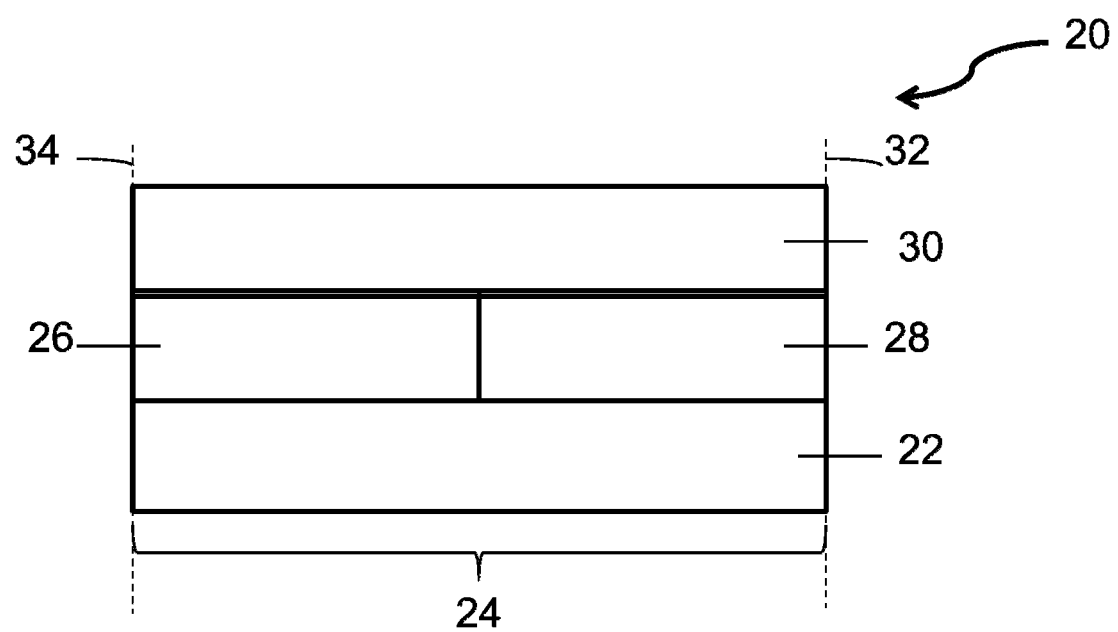
FIG. 3 shows a cross-sectional view of oxidation catalyst composites according to various embodiments.

Such zone coating embodiments may be more easily understood by reference to FIG. 3. FIG. 3 shows an embodiment of a zoned oxidation catalyst composite 20 for abatement of exhaust gas emissions from a diesel engine. A substrate 22, for example, a honeycomb monolith, having a length 24 and an inlet or upstream end 34 and an outlet or downstream end 32 contains three separate coated washcoat zones. The first washcoat zone 26 is located adjacent to the upstream or inlet end 34 of the substrate 22. A second washcoat zone 28 is located adjacent to the outlet or downstream end 32. A third washcoat zone 30 is located on top of the first 26 and second 28 washcoat zones.

FIGS. 4A-4G show embodiments of the zoned oxidation catalyst composite 20 for abatement of exhaust gas emissions from a diesel engine, where the oxidation catalyst composite is coated according to one or more embodiments of the invention. The first washcoat comprises a zeolite, Pt, and a first refractory metal oxide support containing Mn. The second washcoat comprises a second refractory metal oxide support, a platinum (Pt) component and a palladium (Pd) component in a ratio of Pt to Pd in the range of about 10:1 to 1:10. The third washcoat comprises palladium and a rare earth oxide component.

Figure 4A:
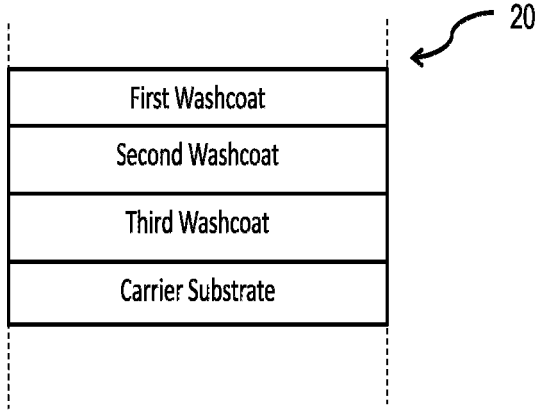
FIGS. 4A-4G show cross-sectional views of oxidation catalyst composites according to various embodiments.
Figure 4B:
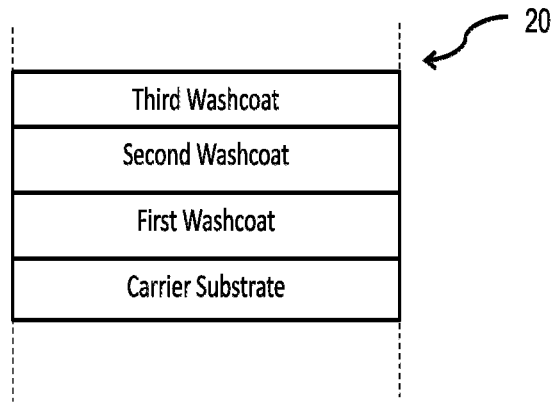

Referring to FIG. 4A, the third washcoat is coated on the carrier substrate, the second washcoat is then coated on top (or over) the third washcoat, and the first washcoat is then coated on top (or over) the second washcoat. Referring to FIG. 4B, in other embodiments, the first washcoat is coated on the carrier substrate, the second washcoat is then coated on top (or over) the second washcoat, and the third washcoat is then coated on top (or over) the second washcoat.

Figure 4C:
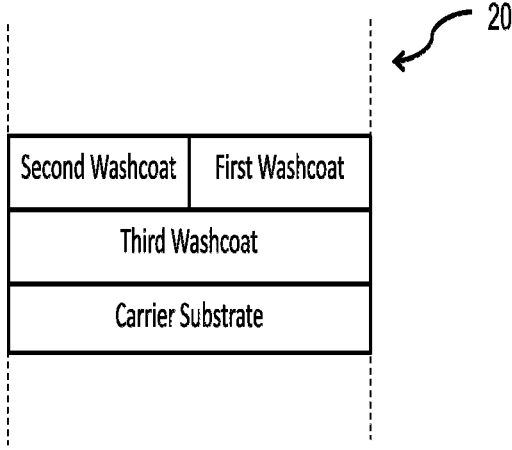
Figure 4D:
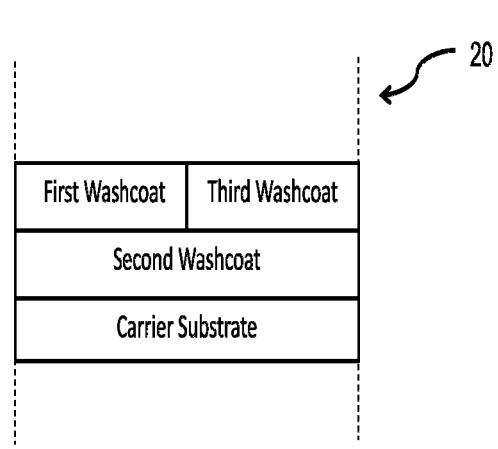
Figure 4E:
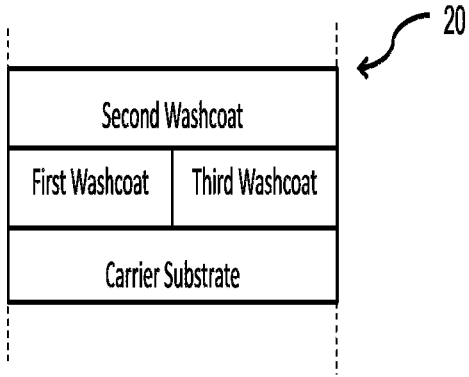
Figure 4F:
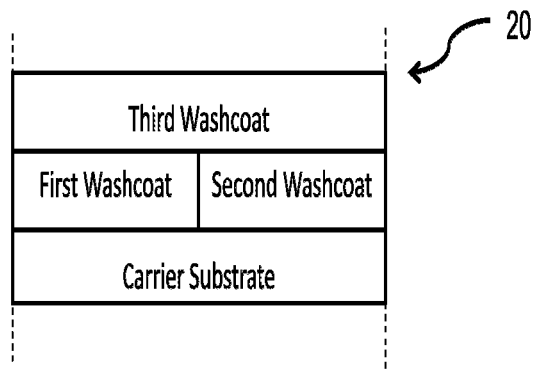
Figure 4G:
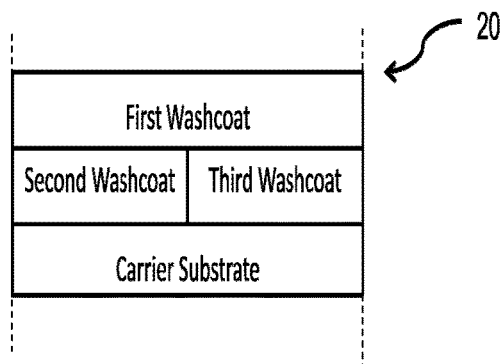

In still further embodiments, the washcoats are coated on a carrier substrate, such that one washcoat is upstream and the other washcoat is downstream. Referring to FIG. 4C, for example, the third washcoat is coated on the carrier, and then the second and first washcoats are coated over (on top) of the third washcoat. Referring to FIG. 4D, the second washcoat is coated on the carrier and then the first and third washcoats are coated over (on top) of the second washcoat. Referring to FIG. 4E, in further embodiments, the first and third washcoats are coated on the carrier, and the second washcoat is then coated over (on top) of the first and third washcoats. Referring to FIG. 4F, in still further embodiments, the first and second washcoats are coated on the carrier, and the third washcoat is then coated over (on top) of the first and second washcoats. Referring to FIG. 4G, the second and third washcoats are coated on the carrier substrate, the first washcoat is then coated on top (or over) the second and third washcoats. It will be appreciated by one skilled in the art, that any arrangement of the three washcoat layers/components, either in a layered or zone structure, are possible.

The oxidation catalyst composite can be used in an integrated emission treatment system comprising one or more additional components for the treatment of diesel exhaust gas emissions. Thus, additional embodiments of a second aspect of the invention are directed to systems for treating a gaseous exhaust stream from a diesel engine. The systems comprises the layered oxidation catalyst composite of the present invention, an exhaust conduit in fluid communication with the diesel engine via an exhaust manifold, and one or more of the following in fluid communication with the layered oxidation catalyst composite: a catalyzed soot filter (CSF), a selective catalytic reduction (SCR) article, a $NO_x$ storage and reduction (NSR) catalytic article.

In addition to treating the exhaust gas emissions via use of the oxidation catalyst composite according to one or more embodiments, a soot filter for removal of particulate matter may be used. The soot filter may be located upstream or downstream from the oxidation catalyst composite, but, typically, the soot filter will be located downstream from the oxidation catalyst composite. In one or more embodiments, the soot filter is a catalyzed soot filter (CSF). The CSF may comprise a substrate coated with a washcoat layer containing one or more catalysts for burning off trapped soot and/or oxidizing exhaust gas stream emissions. In general, the soot burning catalyst can be any known catalyst for combustion of soot. For example, the CSF can be coated with one or more high surface area refractory oxides (e.g., an aluminum oxide or ceria-zirconia) for the combustion of unburned hydrocarbons and to some degree particulate matter. The soot burning catalyst can be an oxidation catalyst comprising one or more precious metal (PM) catalysts (platinum, palladium, and/or rhodium).

Figure 5:
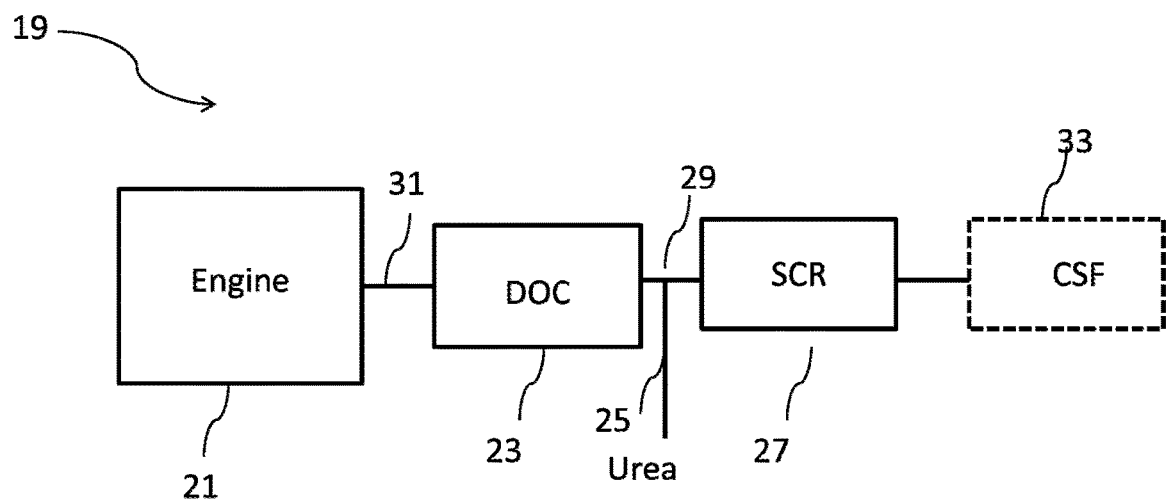
FIG. 5 is a schematic of an engine treatment system according to one or more embodiments.
Figure 6:
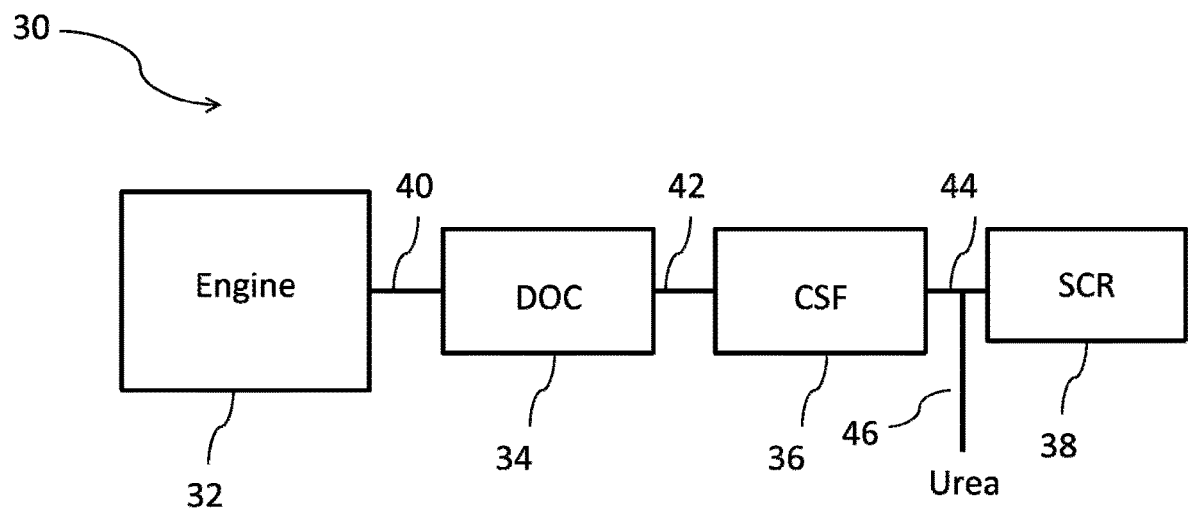
FIG. 6 is a schematic of an engine treatment system according to one or more embodiments.
Figure 7:
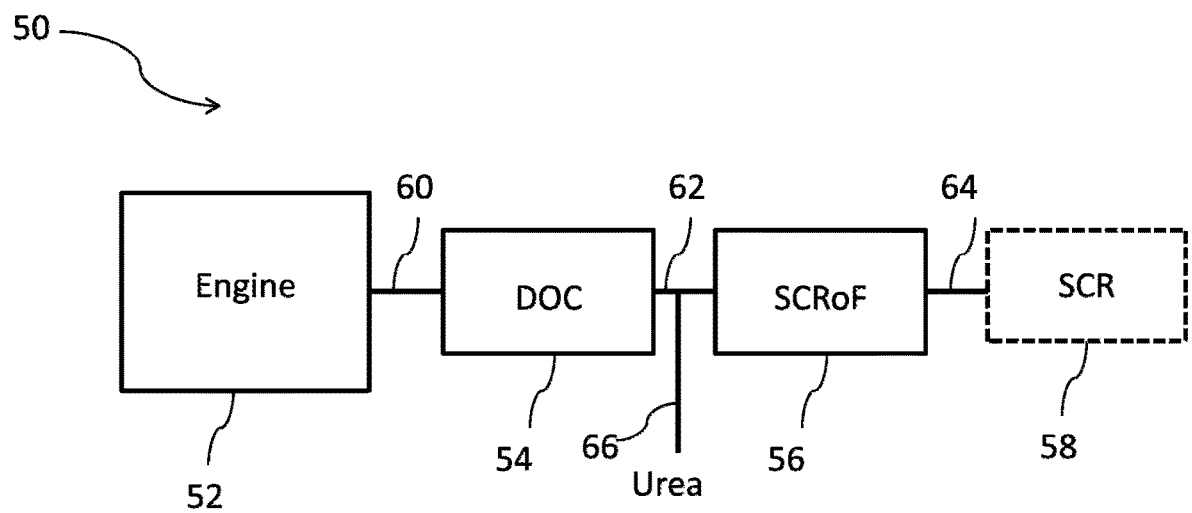
FIG. 7 is a schematic of an engine treatment system according to one or more embodiments.

Exemplary emission treatment systems may be more readily appreciated by reference to FIGS. 5-7, which depict schematic representations of an emission treatment system, in accordance with one or more embodiments of the present invention. In one or more embodiments, the system comprises an exhaust conduit in fluid communication with a diesel engine via an exhaust manifold; the oxidation catalyst composite according to one or more embodiments wherein the substrate is a flow through substrate or a wall-flow substrate, and, optionally, a catalyzed soot filter and an SCR catalyst located downstream from the oxidation catalyst composite. Referring to FIG. 5, in a particular embodiment, the SCR catalyst 27 is located immediately downstream from the oxidation catalyst 23 with no intervening catalyst material between the oxidation catalyst and the SCR catalyst. In a specific embodiment, an optional catalyzed soot filter (CSF) 33 is placed downstream of the SCR catalyst 27.

In general, any known filter substrate can be used, including, e.g., a honeycomb wall flow filter, wound or packed fiber filter, open-cell foam, sintered metal filter, etc., with wall flow filters being typically used. Wall flow substrates useful for supporting the CSF compositions have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 700 or more flow passages (or "cells") per square inch of cross section, although far fewer may be used. For example, the carrier may have from about 7 to 600, more usually from about 100 to 400, cells per square inch ("cpsi"). The cells can have cross sections that are rectangular, square, circular, oval, triangular, hexagonal, or are of other polygonal shapes. Wall flow substrates typically have a wall thickness between 0.002 and 0.1 inches.

Typical wall flow filter substrates are composed of ceramic-like materials such as cordierite, a-alumina, silicon carbide, silicon nitride, zirconia, mullite, spodumene, alumina-silica-magnesia or zirconium silicate, or of porous, refractory metal. Wall flow substrates may also be formed of ceramic fiber composite materials.

In other embodiments, an exemplary emission treatment system may be more readily appreciated by reference to FIG. 6, which depicts a schematic representation of an emission treatment system 30. Referring to FIG. 6, an exhaust gas stream containing gaseous pollutants (e.g., unburned hydrocarbons, carbon monoxide and $NO_x$) and particulate matter is conveyed via an exhaust transfer line 40 from a lean burn engine 32 such as a diesel engine to a diesel oxidation catalyst (DOC) 34, which is in the form of the oxidation catalyst composite according to one or more embodiments of the present invention. In the DOC 34, unburned gaseous and volatile hydrocarbons (i.e., the VOF) and carbon monoxide are largely combusted to form carbon dioxide and water. In addition, a proportion of the NO of the $NO_x$ component may be oxidized to $NO_2$ in the DOC. The exhaust stream is next conveyed via exhaust line 42 to a catalyzed soot filter (CSF) 36, which traps particulate matter present within the exhaust gas stream. The CSF 36 is optionally catalyzed for passive regeneration. After removal of particulate matter, via CSF 36, the exhaust gas stream is conveyed via exhaust line 44. An ammonia precursor (e.g. aqueous urea) is injected via line 46 into the exhaust line 44. The exhaust gas stream with added ammonia is conveyed via line 44 to a downstream selective catalytic reduction (SCR) component 38 for the treatment and/or conversion of $NO_x$.

Another exemplary emission treatment system is shown in FIG. 7, which depicts a schematic representation of an emission treatment system 50. Referring to FIG. 7, an exhaust gas stream containing gaseous pollutants (e.g. unburned hydrocarbons, carbon monoxide and $NO_x$) and particulate matter is conveyed via exhaust line 60 from a lean burn engine 52 such as a diesel engine to a diesel oxidation catalyst (DOC) 54, which is in the form of the oxidation catalyst composite according to embodiments of the present invention. In the DOC 54, unburned gaseous and volatile hydrocarbons (i.e. the VOF) and carbon monoxide are largely combusted to form carbon dioxide and water. In addition, a proportion of the NO of the $NO_x$ component may be oxidized to $NO_2$ in the DOC. The exhaust stream is next conveyed via exhaust line 62. An ammonia precursor (e.g. aqueous urea) is injected via line 66 into the exhaust line 62. The exhaust gas stream with added ammonia is conveyed via line 62 to a selective catalytic reduction component supported within a catalytic soot filter (SCRoF) 56, to trap particulate matter present within the exhaust gas stream and treat and/or convert $NO_x$. Optionally, the exhaust gas stream may be conveyed via line 64 to a downstream selective catalytic reduction (SCR) component 58 for further treatment and/or conversion of $NO_x$.

In these embodiments, a suitable SCR catalyst component for use in the emission treatment system is able to effectively catalyze the reduction of the $NO_x$ component at temperatures below 600° C., so that adequate $NO_x$ levels can be treated even under conditions of low load which typically are associated with lower exhaust temperatures. Specifically, the catalyst article is capable of converting at least 50% of the $NO_x$ component to $N_2$, depending on the amount of reductant added to the system. Another desirable attribute for the composition is that it possesses the ability to catalyze the reaction of $O_2$ with any excess $NH_3$ to $N_2$ and $H_2O$, so that $NH_3$ is not emitted to the atmosphere. Useful SCR catalyst compositions used in the emission treatment system should also have thermal resistance to temperatures greater than 650° C. Such high temperatures may be encountered during regeneration of the upstream catalyzed soot filter.

Suitable SCR catalyst compositions are described, for instance, in U.S. Pat. Nos. 4,961,917 (the '917 patent) and 5,516,497, which are both hereby incorporated by reference in their entirety. Compositions disclosed in the '917 patent include one or both of an iron and a copper promoter present in a zeolite in an amount of from about 0.1 to 30 percent by weight, specifically from about 1 to 5 percent by weight, of the total weight of promoter plus zeolite. In addition to their ability to catalyze the reduction of $NO_x$ with $NH_3$ to $N_2$, the disclosed compositions can also promote the oxidation of excess $NH_3$ with $O_2$, especially for those compositions having higher promoter concentrations. Other specific SCR compositions that may be used in accordance with one or more embodiments of the invention include 8-ring, small pore molecular sieves, for example, those having the structure type selected from the group consisting of AEI, AFT, AFX, CHA, EAB, ERI, KFI, LEV, SAS, SAT, and SAV. In a specific embodiment, the 8-ring small pore molecular sieve has the CHA structure and is a zeolite. The CHA zeolite may contain copper. Exemplary CHA zeolites have a silica to alumina ratio (SAR) greater than about 15, and copper content exceeding about 0.2 wt %. In a more specific embodiment, the mole ratio of silica to alumina is from about 15 to about 256, and copper content from about 0.2 wt % to about 5 wt %. Other useful compositions for SCR include nonzeolitic molecular sieves having the CHA crystal structure. For example, silicoaluminophosphates such as SAPO-34, SAPO-44 and SAPO-18 may be used in accordance with one or more embodiments. Other useful SCR catalysts can include a mixed oxide including one or more of $V_2O_5$, $WO_3$ and $TiO_2$.

The system may further include a $NO_x$ storage and release (NSR) catalytic article. In certain embodiments, one or the other of an SCR or NSR catalytic article is included in the system.

A third aspect of the invention is directed to methods for treating a diesel exhaust gas stream comprising carbon monoxide, hydrocarbons, and $NO_x$. In one or more embodiments, the method comprises contacting an exhaust gas stream with the oxidation catalyst composite of the present invention.

Embodiments of the invention are now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXAMPLES

Example 1

Powder Experiment

Catalysts were prepared comprising two components: (1) Pt on a Mn-containing support; and (2) Pd on a Ce-containing support. The Pt and Pd were separated via fixation on different carriers optimal for each. Fixation occurred with thermal calcination.

To prepare the catalysts, a palladium nitrate solution was added to a high surface area cerium oxide oxide support material. Separately, a solution of Pt-amine was then added to a 5 wt % Mn-containing alumina oxide support material. Individual impregnated powders were dried at 120° C. and calcination at 500° C. for 1 h in air. The solid was crushed and sieved to obtain a particle size of from 250-500 µm. The catalyst was aged at 800° C. for 20 h, in 10% $H_2O$ in air.

Sample A

The catalyst of Sample A comprises a single powder mixture. The powder mixture comprises 4% Pt supported on 5% Mn on alumina and 4% Pd supported on bulk ceria Sample B The catalyst of Sample B comprises two powder layers. The bottom layer comprises a physical blend of 4% Pd supported on bulk ceria, and the top layer comprises 4% Pt supported on 5% Mn on alumina.

Sample C

The catalyst of Sample C is a layered non-ceria control sample. The bottom layer comprises 4% Pd supported on alumina, and the top layer comprises 4% Pt supported on 5% Mn on alumina.

Testing: 200 mg of sample (100 mg of the Pd/carrier and 100 mg Pt/carrier) was diluted to a sample volume of 1 mL (with corundum). All samples were aged at 800° C. for 20 h in 10% $H_2O$ in air. Measurement time: 3 min equilibration time plus 30 s sampling time. Temperature (° C.): 125, 135, 150, 165, 180, 195, 210, 225, 250, 300, 350° C. in a 48× HT(48-cell) rig; GHSV: 45000 h$^{-1}$; Feed Composition: 700 ppm CO, 80 ppm-$C_1$ propylene, 340 ppm-$C_1$ decane/toluene (2/1), 70 ppm NO, 10% $O_2$, 10% $CO_2$, 5% $H_2O$. Two runs of each catalyst were performed, the first run for degreening, and the data from the second run was used for catalyst ranking.

Table 1 presents the CO light off, HC light off, and $NO_2$ yield for the catalysts.

TABLE 1

| Sample | Temperature for CO @50% Conversion (° C.) | Temperature for HC @70% Conversion (° C.) | $NO_2$ Yield at 250° C. (%) |
|---|---|---|---|
| Sample A | 136 | 191 | 79 |
| Sample B | 138 | 183 | 84 |
| Sample C (control) | 158 | 182 | 70 |

Table 1 illustrates that positive impact of physical separation of Pt and Pd on the overall performance if the optimal carrier for each PGM is used. There is a synergy between the Pt and Pd layers which improves CO conversion compared to the control. The best functionality of both components are fully utilized in the structured layer design (smaller benefit for $NO_2$ yield and HC activity are observed for the physical blend). The optimal layered design with separation of components results in low temperature CO and HC oxidation and high $NO_2$ formation.

Example 2

Combination of Three Components in a Layered Structure on a Core Coated Monolith A catalyst was prepared comprising three components: (1) Pt on a Mn-containing support; (2) Pd on a Ce-containing support; and (3) Pt/Pd on an alumina support.

The catalyst comprises three washcoat layers: a bottom coat of Pd on Ceria, a middle coat of Pt/Pd on alumina, and a top coat of Pt on 5% Mn on alumina.

To prepare the catalyst:

Bottom Washcoat: Pd-nitrate was impregnated on bulk ceria followed by calcination at 500 C for 1 h. Pd/ceria was mixed with alumina, followed by dilution with deionized water. The slurry was milled to achieve a particle size of 15 µm and a 42% solids content. The catalyst layer was coated onto a monolith at 0.6 g/in$^3$ and a Pd loading of 5.9 g/ft$^3$.

Middle Washcoat: Pd-nitrate was impregnated on a support of 5% $SiO_2$/alumina. A solution of Pt-amine was added, followed by mixing. The pH was adjusted to pH 4.5 using $HNO_3$. The slurry was milled to obtain a particle size of 8 µm and to obtain a 39% solids content. The middle catalyst layer was coated on top of the bottom coat at a washcoat loading of 1.6 g/in$^3$ and a Pt loading of 22.5 g/ft$^3$ and a Pd loading of 5.6 g/ft$^3$.

Top Washcoat: Pd-nitrate was impregnated onto a support of 5% Mn on alumina. A solution of Pt-amine was added dropwise, followed by mixing. The pH was adjusted to pH 4.3 using $HNO_3$. The slurry was milled to achieve a particle size of 18 µm. Zeolite was then added, followed by mixing. The solids content was 34%. The top catalyst layer was coated on top of the middle coat at a washcoat loading of 0.9 g/in3 and a Pt loading of 15.0 g/ft$^3$ and a Pd loading of 1.0 g/ft$^3$.

Example 3

Combination of Three Components in a Zoned Structure on a Core Coated Monolith A catalyst was prepared comprising three components: (1) Pt on a Mn-containing support; (2) Pd on a Ce-containing support; and (3) Pt/Pd on an alumina support.

The catalyst is in a zone configuration: a bottom coat of Pd on Ceria as the rear zone, and Pt/Pd on alumina as the front zone, and a top coat of Pt on 5% Mn on alumina over the whole monolith.

To prepare the catalyst:

Inlet Bottom Washcoat: Pd-nitrate was impregnated on $SiO_2$/Alumina, followed by dilution with deionized water. The slurry was mixed well. Pt-amine was added dropwise to the slurry, followed by mixing. The pH was adjusted to pH 4 using $HNO_3$. The slurry was then milled to achieve a particle size of 17 μm and a 34% solids content. The catalyst was coated onto the inlet 1 inch zone of a monolith at a washcoat loading of 1.7 $g/in^3$, a Pt loading of 56.3 $g/ft^3$ and a Pd loading of 18.8 $g/ft^3$.

Outlet Bottom Washcoat: Pd-nitrate was impregnated on bulk ceria, followed by calcination at 500° C. for 1 h. Pd/ceria was mixed with alumina, followed by dilution with deionized water. The slurry was milled to achieve a particle size of 13 μm and a 42% solids content. The catalyst was coated onto the outlet 2 inch zone of the monolith at a washcoat loading of 1.2 $g/in^3$ and a Pd loading of 9.4 $g/ft^3$.

Top Washcoat: amine was impregnated onto a support of 5% Mn on alumina, followed by dilution with deionized water and mixing. The pH was adjusted to pH 4.6 using $HNO_3$. The slurry was milled to achieve a particle size of 19 μm. Zeolite was then added, followed by mixing. The solids content was adjusted to 35%. The top catalyst layer was coated on top of both the inlet and outlet zones at a washcoat loading of 1.0 $g/in^3$ and a Pt loading of 18.8 $g/ft^3$.

Example 4

Combination of Three Components in a Zoned Structure on Core Coated Monolith A catalyst was prepared comprising three components: (1) Pt on a Mn-containing support; (2) Pd on a Ce-containing support; and (3) Pt/Pd on an alumina support.

The catalyst is in a zone configuration: a bottom coat of Pd on Ceria as the rear zone, and Pt/Pd on alumina as the front zone, and a top coat of Pt on 5% Mn on alumina over the whole monolith.

To prepare the catalyst:

Inlet Bottom Washcoat: Pd-nitrate was impregnated on $SiO_2$/Alumina, followed by dilution with deionized water. The slurry was mixed well. Pt-amine was added dropwise to the slurry, followed by mixing. The pH was adjusted to pH 4 using $HNO_3$. The slurry was then milled to achieve a particle size of 20 μm and a 34% solids content. The catalyst was coated onto the inlet 1 inch zone of a monolith at a washcoat loading of 1.7 $g/in^3$, a Pt loading of 45.0 $g/ft^3$, and a Pd loading of 15.0 $g/ft^3$.

Outlet Washcoat: Pd-nitrate was impregnated on bulk ceria, followed by calcination at 500° C. for 1 h. Pd/ceria was mixed with alumina, followed by dilution with deionized water. The slurry was milled to achieve a particle size of 16 μm and a 38% solids content.

The catalyst was coated onto the outlet 2 inch zone of the monolith at a washcoat loading of 1.4 $g/in^3$ and a Pd loading of 37.5 $g/ft^3$.

Top Washcoat: Pt-amine was impregnated onto a support of 5% Mn on alumina. The wet powder was diluted with deionized water followed by mixing. The pH was adjusted to pH 4.6 using $HNO_3$. The slurry was milled to achieve a particle size of 19 μm. Zeolite was then added, followed by mixing. The solids content was 35%. The top catalyst layer was coated on top of both the inlet and outlet zones at a washcoat loading of 1.0 $g/in^3$ and a Pt loading of 15.0 $g/ft^3$.

Table 2 shows the formulation of the zoned catalyst.

TABLE 2

| | Bottom Coat | | | | | | Top Coat | | |
| | Front Zone | | | Rear Zone | | | | | |
| | Total PGM | Pt | Pd | Total PGM | Pt | Pd | Total PGM | Pt | Pd |
|---|---|---|---|---|---|---|---|---|---|
| Example 3 | 75.1 | 56.3 | 18.8 | 9.4 | 0 | 9.4 | 18.8 | 18.8 | 0 |
| Example 4 | 60 | 45.0 | 15.0 | 37.5 | 0 | 37.5 | 15.0 | 15.0 | 0 |

Preparation of Reference A

An oxidation catalyst composite was prepared by coating two layers of Pt- and/or Pd-containing aqueous slurry onto a cordierite honeycomb monolith substrate.

Bottom Washcoat: The bottom washcoat was prepared as follows: A support material comprising 5% $SiO_2/Al_2O_3$ was impregnated with a Pd nitrate solution and was mixed well. The slurry was diluted with deionized water followed by impregnated with a Pt-amine. The pH was adjusted to pH 4.7 using $HNO_3$. The slurry was milled to achieve a particle size of 21 μm followed addition of deionized water to give a 38% solids content. The slurry was coated onto a honeycomb monolith. The coated monolith was dried and then calcined in the range of 400-550° C. for 2-4 hours. The washcoat loading for the bottom coat was approximately 1.6 $g/in^3$ for a total PGM loading of 21.9 $g/ft^3$, a Pt loading of 9.4 $g/ft^3$, and a Pd loading of 12.5 $g/ft^3$.

Top Washcoat: The top washcoat was prepared as follows: A support material comprising 5% $SiO_2/Al_2O_3$ was impregnated with a Pt-amine, and was mixed well. The pH was adjusted to pH 4.8 using $HNO_3$. The slurry was milled to achieve a particle size of 19.6 μm. Zeolite was added, and the slurry was mixed well. Alumina binder, was added to obtain a 30.7% solids content. The slurry was coated onto the cordierite substrate on top of the bottom coat. The coated monolith was dried and then calcined in the range of 400-550° C. for 2-4 hours. The washcoat loading for the top coat was approximately 1.2 $g/in^3$ for a Pt loading of 28.1 $g/ft^3$.

SAMPLE TESTING

Testing:

The catalysts of Examples 2 through 4 were aged at 800° C. for 25 h in 10% $H_2O$, 10% $O_2$ in $N_2$ and tested under transient laboratory reactor conditions using the NEDC protocol.

Table 3 shows the CO conversion, and $NO_2$ formation results.

TABLE 3

| Sample | CO Conversion (%) | % NO to NO$_2$ |
| --- | --- | --- |
| Reference A | 59.8 | 18.8 |
| Example 2 | 67.3 | 26.6 |
| Example 3 | 68.1 | 22.5 |
| Example 4 | 79.6 | 24.8 |

As illustrated in Table 3, any combination of the three layers is superior for CO performance and NO$_2$ formation.

Example 5

Combination of Three Components in a Layered Structure

A catalyst was prepared comprising three components: (1) Pt on a Mn-containing support; (2) Pd on a Ce-containing support; and (3) Pt/Pd on an alumina support.

The catalyst comprises three washcoat layers: a bottom coat of Pd on Ceria, a middle coat of Pt/Pd on alumina, and a top coat of Pt on 5% Mn on alumina.

To prepare the catalyst:

Bottom Washcoat: Pd-nitrate was impregnated on bulk ceria, followed by calcination at 500° C. for 1 h. Pd/ceria was mixed with alumina, followed by dilution with deionized water. The slurry was milled to achieve a particle size of 15 μm and a 42% solids content. The catalyst layer was coated onto a monolith at 1.6 g/in$^3$ and a Pd loading of 44.5 g/ft$^3$.

Middle Washcoat: Pd-nitrate was impregnated on a support of 5 wt % SiO$_2$/alumina. A solution of Pt-amine was added dropwise, followed by mixing. The pH was adjusted to pH 4.5 using HNO$_3$. The slurry was milled to obtain a particle size of 8 μm and to obtain a 39% solids content. The middle catalyst layer was coated on top of the bottom coat at a washcoat loading of 1.5 g/in$^3$ and a Pt loading of 50.0 g/ft$^3$ and a Pd loading of 12.5 g/ft$^3$.

Top Washcoat: Pd-nitrate was impregnated onto a support of 5% Mn on alumina. A solution of Pt-amine was added dropwise, followed by mixing. The pH was adjusted to pH 4.3 using HNO$_3$. The slurry was milled to achieve a particle size of 18 μm. Zeolite was then added, followed by mixing. The solids content was 34%. The top catalyst layer was coated on top of the middle coat at a washcoat loading of 0.9 g/in$^3$ and a Pt loading of 40.0 g/ft$^3$ and a Pd loading of 3.0 g/ft$^3$.

Preparation of Reference B

An oxidation catalyst composite was prepared by coating two layers of Pt- and/or Pd-containing aqueous slurry onto a cordierite honeycomb monolith substrate.

Bottom Washcoat: The bottom washcoat was prepared as follows: A support material comprising 5% SiO$_2$/Al$_2$O$_3$ was impregnated with a Pd nitrate solution. Subsequently, the slurry was diluted with deionized water and was impregnated with a Pt-amine. The pH was adjusted to pH 4.7 using HNO$_3$. The slurry was milled to achieve a particle size of 21 μm. There was a 38% solids content. The slurry was coated onto a honeycomb monolith. The coated monolith was dried and then calcined in the range of 400-550° C. for 2-4 hours. The washcoat loading for the bottom coat was approximately 1.6 g/in$^3$ for a Pt loading of 67.5 g/ft$^3$ and a Pd loading of 27.0 g/ft$^3$.

Top Washcoat: The top washcoat was prepared as follows: A support material comprising 5% SiO$_2$/Al$_2$O$_3$ was impregnated with a Pt-amine and was mixed well. The pH was adjusted to pH 4.8 using HNO$_3$. The slurry was milled to achieve a particle size of 19.6 μm. Zeolite was added, and the slurry was mixed well. Alumina binder was added to obtain a 30.7% solids content. The slurry was coated onto the cordierite substrate on top of the bottom coat. The coated monolith was dried and then calcined in the range of 400-550° C. for 2-4 hours. The washcoat loading for the top coat was approximately 1.2 g/in$^3$ for a Pt loading 40.0 g/ft$^3$.

The catalysts of Example 5 and Reference B were coated onto a full size monolith (5.66"×3.82", 400/4), and were oven aged for 16 hrs at 800° C. with 10% steam, 10% O$_2$ in N$_2$. The samples were evaluated on a 3 L diesel engine using NEDC test protocol.

For light-off evaluation, each catalyst was placed downstream of an exhaust line of a 6 cylinder 3 L light duty diesel engine. The light-off procedure comprised two segments: (1) a NO$_2$/NO$_x$ ratio test and (2) CO and HC light-off test. In segment (1), the engine was operated without EGR application and with NO$_x$, CO, and HC concentrations of 600, 200, and 50 ppm in the exhaust stream, respectively. The heating and gas flow rates under standard conditions were 6° C./min and 115 m$^3$/h. Segment (2) combined a steady state light-off with a 22.5° C./min temperature ramp, with EGR application. The temperature ramp light-off entailed HC pre-adsorption (ca. 0.5 g) prior to ramp up. CO and HC concentrations in the exhaust stream were constant at 1200 ppm and 150 ppm (C$_3$ basis), respectively. The gas flow rate during this segment was 50 m$^3$/h.

A lower light-off temperature characterizes a better gas activity.

Table 4 shows the results for HC and CO lightoff, and the NO$_2$/NO$_x$ ratio.

TABLE 4

| | Example 5 | Reference B |
| --- | --- | --- |
| Temperature for CO @50% Conversion (° C.) | 185 | 207 |
| Temperature for HC @70% Conversion (° C.) | 191 | 248 |
| NO$_2$/NO$_x$ at 300° C. | 18 | 13 |

As illustrated in Table 4, the three-layer catalyst outperforms the reference in HC and CO light-off and in NO$_2$/NO$_x$ performance.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. An oxidation catalyst composite for abatement of exhaust gas emissions from a lean burn engine comprising:
   a carrier substrate having a length, an inlet end and an outlet end, an oxidation catalyst catalytic material on the carrier substrate, the oxidation catalyst catalytic material comprising:
   a first washcoat including a mixture of a zeolite and a first refractory metal oxide support, the first refractory metal oxide impregnated with Pt and optionally Pd, wherein the first refractory metal oxide support further contains Mn that is present in the first refractory metal oxide support as surface-dispersed manganese oxide or as discrete manganese oxide particles;
   a second washcoat including a second refractory metal oxide support, a platinum (Pt) component and a palladium (Pd) component in a ratio of Pt:Pd in the range of about 10:1 to 1:10; and
   a third washcoat comprising palladium and a rare earth oxide component, the third washcoat being substantially free of platinum;
   wherein the oxidation catalyst composite is effective to abate hydrocarbon and carbon monoxide, and to oxidize NO to $NO_2$ in the lean burn engine exhaust.

2. The oxidation catalyst composite of claim 1, wherein the Pt:Pd ratio of the first washcoat is in the range of 1:0 to 10:1.

3. The oxidation catalyst composite of claim 1, wherein the first washcoat is substantially free of palladium.

4. The oxidation catalyst composite of claim 2, wherein the palladium component is present in an amount in the range of about 0.1 $g/ft^3$ to about 10 $g/ft^3$.

5. The oxidation catalyst composite of claim 1, wherein the Mn content of the first washcoat is in the range of 0.1% to 20% by weight.

6. The oxidation catalyst composite of claim 5, wherein the Mn content is in the range of 3 to 10% by weight.

7. The oxidation catalyst composite of claim 1, wherein the Mn oxide is derived from a soluble Mn species or from bulk Mn oxides.

8. The oxidation catalyst composite of claim 7, wherein the soluble Mn species is selected from the group consisting of Mn acetate, Mn nitrate, Mn sulfate, and combinations thereof.

9. The oxidation catalyst composite of claim 7, wherein the bulk Mn oxide is selected from the group consisting of MnO, $MnO_3$, $MnO_2$, and combinations thereof.

10. The oxidation catalyst of claim 1, wherein the first refractory metal oxide support comprises alumina, silica, zirconia, titania, ceria, or combinations thereof.

11. The oxidation catalyst composite of claim 1, wherein the first washcoat comprises Pt in an amount in the range of about 10 $g/ft^3$ to 100 $g/ft^3$.

12. The oxidation catalyst composite of claim 11, wherein the first washcoat comprises Pd in an amount in the range of about 0.1 $g/ft^3$ to about 10 $g/ft^3$.

13. The oxidation catalyst composite of claim 1, wherein the first washcoat comprises a hydrothermally stable zeolite in the form of 6 to 12 member ring structures selected from the group consisting of ZSM-5, beta, mordenite, Y zeolite, chabazite, ferrierite, and combinations thereof.

14. The oxidation catalyst composite of claim 1, wherein the second refractory metal oxide support comprises alumina, silica, zirconia, titania, ceria, or combinations thereof.

15. The oxidation catalyst composite of claim 14, wherein the second washcoat comprises a Pt component in an amount in the range of about 10 $g/ft^3$ to 100 $g/ft^3$.

16. The oxidation catalyst composite of claim 14, wherein the second washcoat comprises a Pd component in an amount in the range of about 10 $g/ft^3$ to 100 $g/ft^3$.

17. The oxidation catalyst composite of claim 1, wherein the first washcoat is substantially free of barium, and the second washcoat is substantially free of zeolite.

18. The oxidation catalyst composite of claim 1, wherein the third washcoat comprises a rare earth oxide component selected from the group consisting of Ce, Nd, Y, Pr, Zr, La, and combinations thereof.

19. The oxidation catalyst composite of claim 18, wherein the rare earth oxide component comprises ceria and is present in an amount of at least 80% by weight.

20. The oxidation catalyst composite of claim 19, wherein ceria is present in an amount of at least 99% by weight.

21. The oxidation catalyst composite of claim 20, wherein the third washcoat comprises a Pd component in an amount in the range of about 10 $g/ft^3$ to 100 $g/ft^3$ supported on the rare earth oxide component.

22. The oxidation catalyst composite of claim 1, wherein the first, second and third washcoats of the catalyst composite can be layered or zoned, and wherein the carrier substrate is a flow-through monolith substrate.

23. The oxidation catalyst composite of claim 22, wherein the third washcoat is coated on the carrier substrate, the second washcoat is coated on top of the third washcoat, and the first washcoat is coated on top of the second washcoat.

24. The oxidation catalyst composite of claim 22, wherein the second washcoat is coated on the inlet end of the carrier substrate, the third washcoat is coated on the outlet end of the carrier substrate, and the first washcoat is coated on top of the second washcoat and the third washcoat.

25. The oxidation catalyst composite of claim 1, wherein the carrier substrate comprises a flow-through monolith.

26. A method for treating a diesel engine exhaust gas stream, the method comprising contacting the diesel engine exhaust gas stream with the oxidation catalyst composite of claim 1.

27. The method of claim 26, further comprising passing the diesel engine exhaust gas stream to an SCR catalyst composition immediately downstream from the oxidation catalyst.

28. The method of claim 27, wherein the SCR catalyst composition is disposed on a wall flow monolith.

29. A system for treatment of a lean burn engine exhaust gas stream including hydrocarbons, carbon monoxide, and other exhaust components, the system comprising:
   an exhaust conduit in fluid communication with the lean burn engine via an exhaust manifold;
   the oxidation catalyst composite of claim 1, wherein the carrier substrate is a flow through substrate; and
   a catalyzed soot filter and an SCR catalyst located downstream from the oxidation catalyst.

30. The system of claim 29, wherein the SCR catalyst is coated onto the catalyzed soot filter.

31. The system of claim 29, wherein the SCR catalyst is on a flow through substrate immediately downstream from the oxidation catalyst composite and the catalyzed soot filter is downstream from the SCR catalyst.

* * * * *